March 3, 1931.  W. G. JOHNSON  1,794,712
MINE SHAFT GATE
Filed Feb. 12, 1930   3 Sheets-Sheet 1

Inventor
WILLIAM G. JOHNSON
By Davis & Davis
Attorneys

March 3, 1931.  W. G. JOHNSON  1,794,712
MINE SHAFT GATE
Filed Feb. 12, 1930  3 Sheets-Sheet 2
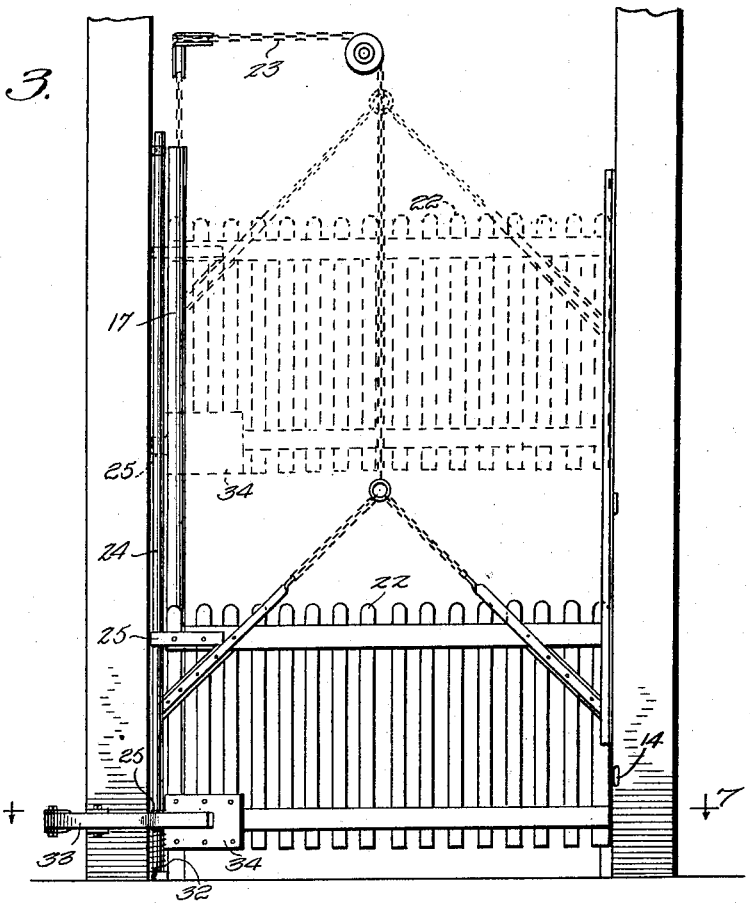
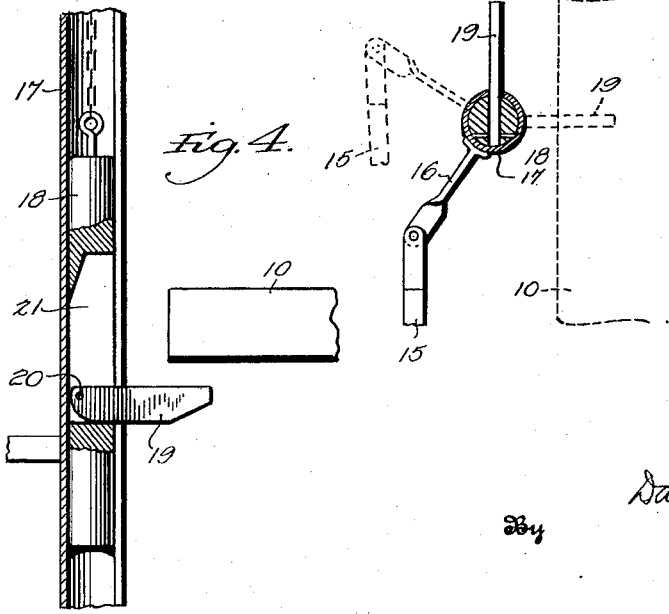
Inventor
WILLIAM G. JOHNSON
By Davis & Davis
Attorneys March 3, 1931.   W. G. JOHNSON   1,794,712
MINE SHAFT GATE
Filed Feb. 12, 1930   3 Sheets-Sheet 3

Inventor
WILLIAM G. JOHNSON

By Davis & Davis

Attorneys

Patented Mar. 3, 1931

1,794,712

UNITED STATES PATENT OFFICE

WILLIAM G. JOHNSON, OF PITTSTON, PENNSYLVANIA

MINE-SHAFT GATE

Application filed February 12, 1930. Serial No. 427,913.

The object of this invention is to provide a mine-shaft landing with a gate apparatus which complies with the present mine safety laws of the State of Pennsylvania, and, in pursuance of this object, I provide a combined swinging and sliding gate and means whereby when the cage descends onto the landing-stops (which have been previously set by hand by a person at the landing), the gate will be automatically raised to open position, means being also provided whereby it will be impossible to swing the gate to open position unless the cage is at the landing and the landing-stops are adjusted to inoperative position, as more fully hereinafter set forth.

In the drawing annexed—

Fig. 3 is a side elevation taken at right angles to the view shown in Fig. 1;

Figs. 4 and 5 are views of details hereinafter described;

Figure 1:
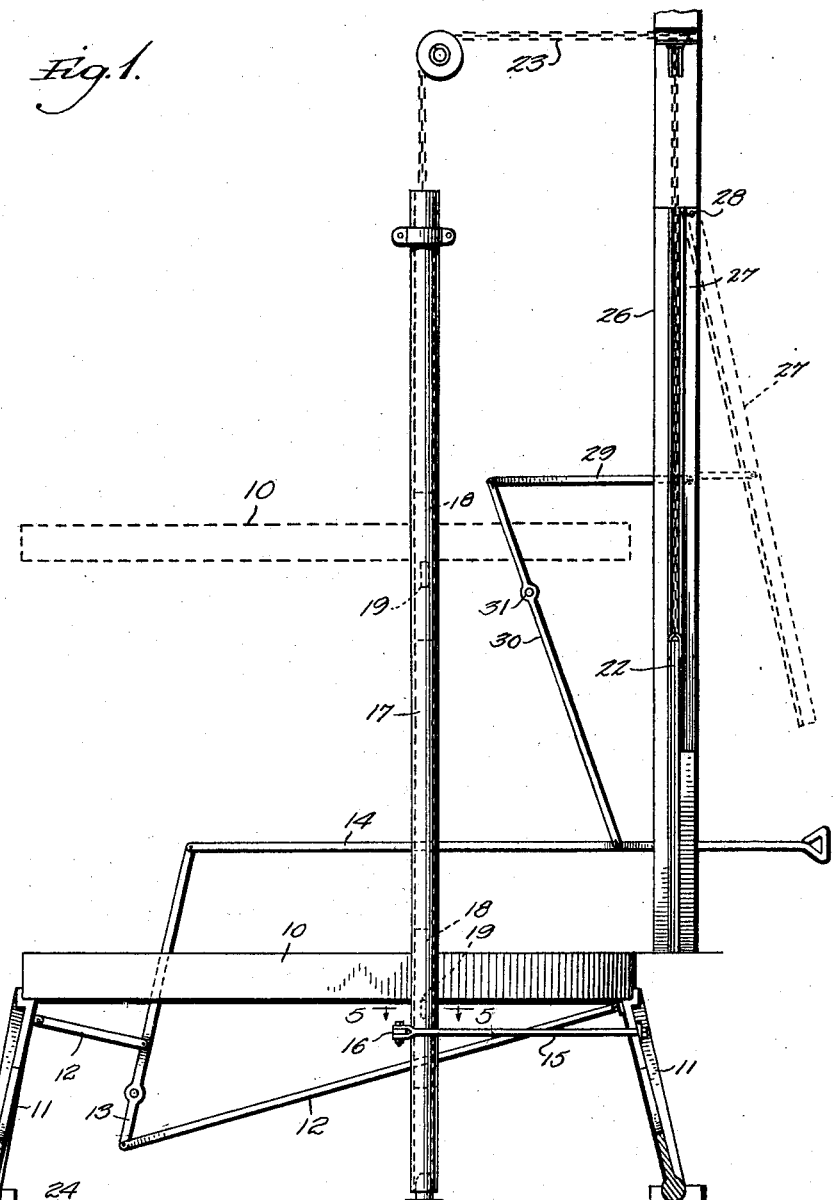
Fig. 1 is a side elevation showing the cage resting on the landing-stops.

Referring to the drawing annexed by reference-characters, 10 designates the floor of the cage which is adapted to come to rest upon landing-stops 11 when said stops are manually adjusted into position to stop the cage, these stops being pivotally supported at their lower edges and being adapted to be swung inwardly into the path of the cage and outwardly away from the path of the cage by the following lever mechanism:

Attached to each of the landing-stops is a link 12, one of which is attached to the lower end of a lever 13 and the other of which is attached to said lever 13 at a point above its lower end. The upper end of the lever 13 is connected to a push-pull rod 14, the outer end of which is provided with a suitable handle to enable the man at the landing to manually adjust the landing-stops into and out of operative position.

One of the landing-stops is connected by a link 15 to an arm 16 rigidly secured to a vertical rotative slotted tube 17 which stands parallel to the line of movement of the cage. Within this rotatable tube 17 is arranged a sliding weight 18 which carries a trigger 19, this trigger being pivotally mounted at 20 in a vertical slot 21 formed in the weight and being long enough to project inwardly far enough to lie in the path of the cage when the tube 17 is given a quarter rotation. When the landing-stops are adjusted to stopping position, as shown in Fig. 1, the link 15 will rotate the tube far enough to position the trigger 19 in the path of the descending cage, and when the cage strikes the trigger 19 the same, together with its weight 18 will be forced downwardly in the tube 17 to the position shown in dotted lines in Fig. 1, and this downward movement of the weight will raise a sliding gate 22 through the medium of a chain 23, one end of which extends downwardly into the upper end of tube 17 and the other end of which is suitably connected to the gate. At its swinging end, the gate is hinged to a vertical pintle post 24 by means of hinge-straps 25, the straps being adapted to freely slide up and down on the pintle post and to turn thereon to permit the gate to swing open and closed. The free end of the gate works vertically between a pair of guide-irons 26 and 27. With this construction, it will be observed that when the cage settles upon the stops 11, the downward movement of the cage will automatically raise the gate to open position, as shown in dotted lines in Fig. 3.

While the two guide-irons 26, 27 are in operative position, as shown in full lines in Fig. 1, the outer end, namely, 27, prevents the gate swinging to open position on its hinges, but, when the landing-stops 11 are adjusted to inoperative position, said outer guide-iron 27 will be adjusted to inoperative position, i. e., in position to permit the gate to freely swing open. To do this, I pivot the upper end of the guide-iron at 28 and connect the guide-iron at a point below its upper end by means of a link 29 to the upper end of a lever 30 which is pivoted at 31 and has its lower end pivotally connected to the aforesaid push-pull rod 14, so that, when said rod 14 is pushed inwardly to throw the landing-stops out of operative position, the guide-iron 27 will be swung outwardly on its hinge to the dotted line position shown in Fig. 1, and thus free the swinging end of the gate, permitting it to be swung to open or closed position, with the post 24 acting as a pintle. It will thus be observed that when the landing-stops are adjusted to a position for stopping the cage, it will be impossible to swing the gate open, whereas, when these stops are adjusted to inoperative position, the gate will be free to swing open on its hinges.

Figure 2:
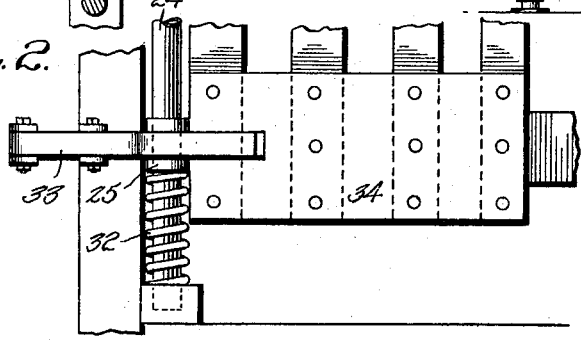
Fig. 2 is a detail side elevation of part of the gate-locking device.
Figure 6:
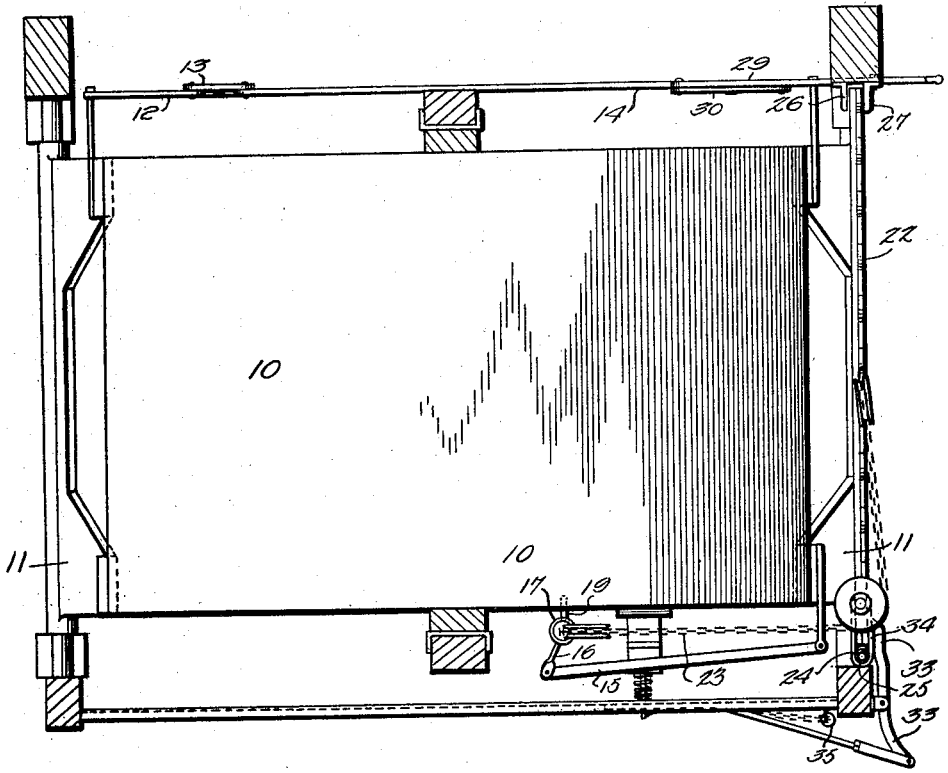
Fig. 6 is a plan view, the vertical posts being in horizontal section.
Figure 7:
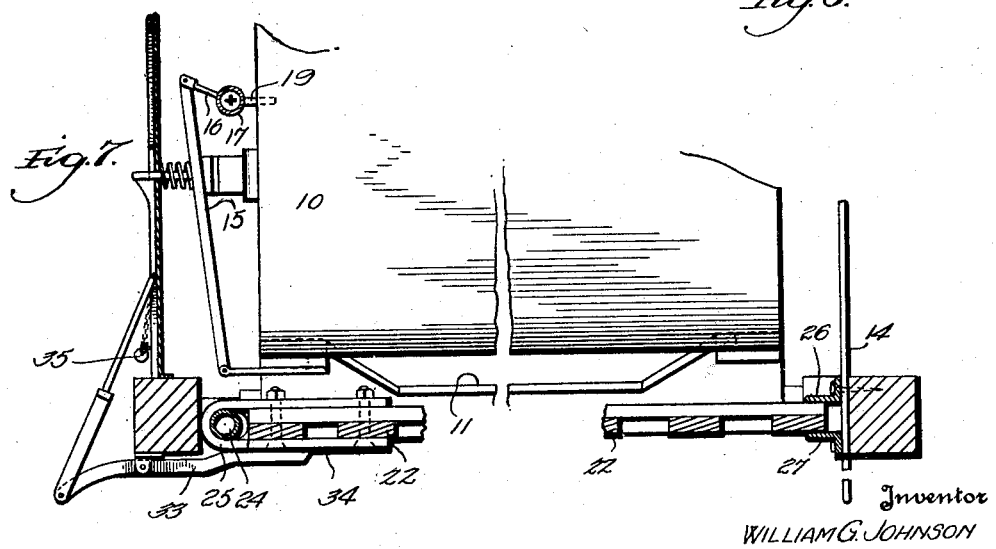
Fig. 7 is a horizontal section taken on the line 7—7 of Fig. 3.

For cushioning the fall of the gate, I may use a coil-spring 32, shown in Fig. 2. In connection with the present invention, I may also use the gate-locking device shown in my former Patent 1,143,766, June 22, 1915, except that in the present instance the lever designated $n$ in said patent and numbered 33 in this case is not permanently connected to the gate, as otherwise it would be impossible for the gate to slide up and down. In the present instance, this lever 33 is arranged to slidingly engage the face of a plate 34 fastened to the gate and forming preferably an extension of one of the straps 25, so that, while the gate is down, in closed position, the lever 33 will always bear against the face of this plate 34 and thus prevent the gate being swung open unless the elevator is at the landing and has unlocked the locking device set forth in said patent. To automatically swing the gate to closed position, I may attach a weight 35 by means of a chain to one of the locking-bars of the locking apparatus, as shown in Fig. 7. The advantage of pivoting the trigger 19 and the weight is that it may be folded up into the slot when the weight is dropped down into the tube, and another advantage is that, should the trigger be set in operative position accidentally while the cage is passing upwardly in the shaft, the trigger will freely swing upwardly to a position out of the way so as to thereby avoid injuring the mechanism. It will be obvious that the gate-actuating mechanism may be duplicated on the opposite side of the shaft where a two-gate landing is desired.

It will be observed that the trigger 19 is pivoted off center so that it tends normally to swing down to a horizontal position; this is advantageous in that it is desirable at all times to have this trigger in operative position except during the time the apparatus is being assembled. It will be observed also that the arrangement of the gate-lifting chain 23 and the pulleys over which it runs is such that when the gate is swung open on its hinges this lifting chain will lift the weight 18; this is advantageous in that this weight 18 will thus be brought into action to assist the weight 35 in normally closing the gate.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim as new is:

1. In a safety-gate apparatus for mine-shafts, a combined swinging and sliding gate, means actuated by a descending cage for raising said gate to open position, and means for locking said gate against swinging to open position when said raising mechanism is put into action.

2. In a safety mine gate apparatus, a gate adapted to slide upwardly to open position and also to swing on hinges to open position, cage-stopping devices and manual means for putting them into operative position to stop the cage at a landing, automatic devices for raising the gate to open position as the cage descends onto said stops, this automatic mechanism being adjusted to operative position when said stops are adjusted to operative position, and means whereby when said stops are put into operative position the gate will be locked against swinging open and when said stops are adjusted to inoperative position said gate will be released for operation on its hinges.

3. In a safety-gate appliance for mine-shafts, a combined sliding and swinging gate, the free edge of the gate being guided between guide-irons, one of which is pivoted so as to be shifted to a position to free the free edge of the gate to permit it to swing open, manually-operated means for stopping the cage at the landing, and devices connected with said means whereby said pivoted guide-iron will be actuated to operative position as a guide for the gate when said cage-stopping mechanism is put into action.

4. In a mine-shaft gate mechanism, a vertically-sliding gate and means for raising the gate as the cage descends to the landing embodying a vertical rotary tube, a vertically-sliding weight in said tube, means connecting this weight with the gate, a trigger adapted to extend into the path of the descending cage, said trigger being pivotally mounted within the weight in such manner as to adapt it to swing upwardly into a slot in the weight.

5. In a safety-gate appliance for mining-shafts, a vertically-sliding gate, a pair of cage-stops and manual means for actuating the same, and means for automatically raising the gate as the cage descends embodying a rotary vertical tube actuated simultaneously with said stops, a weight in said tube carrying a trigger adapted to be adjusted in the path of the cage when said tube is rotated, a chain connected to said weight extending up out of its upper end and connected to the top of the gate to thereby cause said gate to be raised when the trigger and weight are depressd by the cage.

In testimony whereof I hereunto affix my signature.

WILLIAM G. JOHNSON.